June 4, 1968  R. A. WATSON ET AL  3,386,292

DIGITAL ACCELEROMETER

Filed Sept. 28, 1964  2 Sheets-Sheet 1

INVENTORS
ROBERT A. WATSON
ROBERT E. MAHONEY
THOMAS C. NIELSEN
JAMES J. KIERNAN

United States Patent Office 3,386,292
Patented June 4, 1968

3,386,292
DIGITAL ACCELEROMETER
Robert A. Watson, Endicott, Robert E. Mahoney, Apalachin, Thomas C. Nielsen, Endwell, and James J. Kiernan, Apalachin, N.Y., assignors to International Business Machines Corporation, New York, N.Y., a corporation of New York
Filed Sept. 28, 1964, Ser. No. 399,777
8 Claims. (Cl. 73—517)

The present invention relates to the class of force measuring apparatus referred to as accelerometers, and more particularly to accelerometers providing an output representation in digital form.

An accelerometer is a force measuring or force transducing device that provides an indication, usually electric signal in form, representative of the acceleration to which it is subjected. Such a device consists essentially of a relatively large mass of material (seismic mass) on which accelerations can produce an easily detectable effect, and a sensor associated with the mass and responsive to the acceleration effect for generating representative signals. In the past these sensors have included strain gages, electromagnetic devices, piezoelectric crystals, stressed vibrating members, and the like.

It is a fundamental proposition of the present invention to utilize a special crystal force sensor of high precision that is readily adaptable for providing a digital output signal. The special sensor is a crystal cut along certain axes for vibration in what is termed shear mode. In this connection, it has been found that the natural frequency of vibration of a crystal, such as quartz, is highly linear with respect to its mechanical stressed condition. Accordingly, incorporating the vibrating crystal into an oscillator circuit as a frequency control means provides an alternating electric signal the frequency of which is a digital representation of the stressed condition of the crystal. A full presentation of force sensors of this character is to be found in co-pending U.S. patent application Ser. No. 334,807, filed Dec. 31, 1963, entitled "Force Transducing Means," by R. E. Mahoney, and assigned to the same assignee. This invention employs the teachings of that application in providing crystal sensors for the digital accelerometer.

In the aircraft and space environments, where accelerometers are typically employed, processing of data supplied by the accelerometers in conjunction with other information furnished by inertial platforms, for example, is usually accomplished digitally in order to obtain the highest degree of accuracy. It is clear that the capability of providing a direct digital representation of detected accelerations is a considerable advantage for the accelerometer described here.

Stated briefly, this invention contemplates a pair of seismic masses resiliently mounted in regard to each other. A separate crystal sensor is operatively associated with each seismic mass and they are mutually arranged such that accelerations along a preferred axis of application, or sensing direction, tend to increase the compressive force on one sensor while simultaneously reducing it on the other. The two crystals are incorporated into oscillator circuitry for generating an alternating signal, the frequency of which has a direct functional relationship to the magnitude of the acceleration to which the seismic masses are subjected.

It is therefore a fundamental object of the invention to provide a force measuring means supplying a digital representation thereof.

Another object of the invention is the provision of an accelerometer embodying a mechanically vibrating crystal as a sensing means.

Still another object of the invention is the provision of an accelerometer having paired force measuring means arranged along an axis of applied accelerations, each having its direction of positive force application diametrically opposed to that of the other.

Another object is the provision of an accelerometer furnishing an alternating electric signal, the frequency characteristics of which are a direct representation of the acceleration experienced.

Another object is the provision of an accelerometer having a pair of resiliently mounted seismic masses, each having a crystal force measuring means associated therewith.

Still another object is the provision of an accelerometer of inexpensive and simplified design, and readily amenable to large volume production.

The foregoing and other objects, features and advantages of the invention will be apparent from the following more particular description of a preferred embodiment of the invention, as illustrated in the accompanying drawings.

Figure 1:
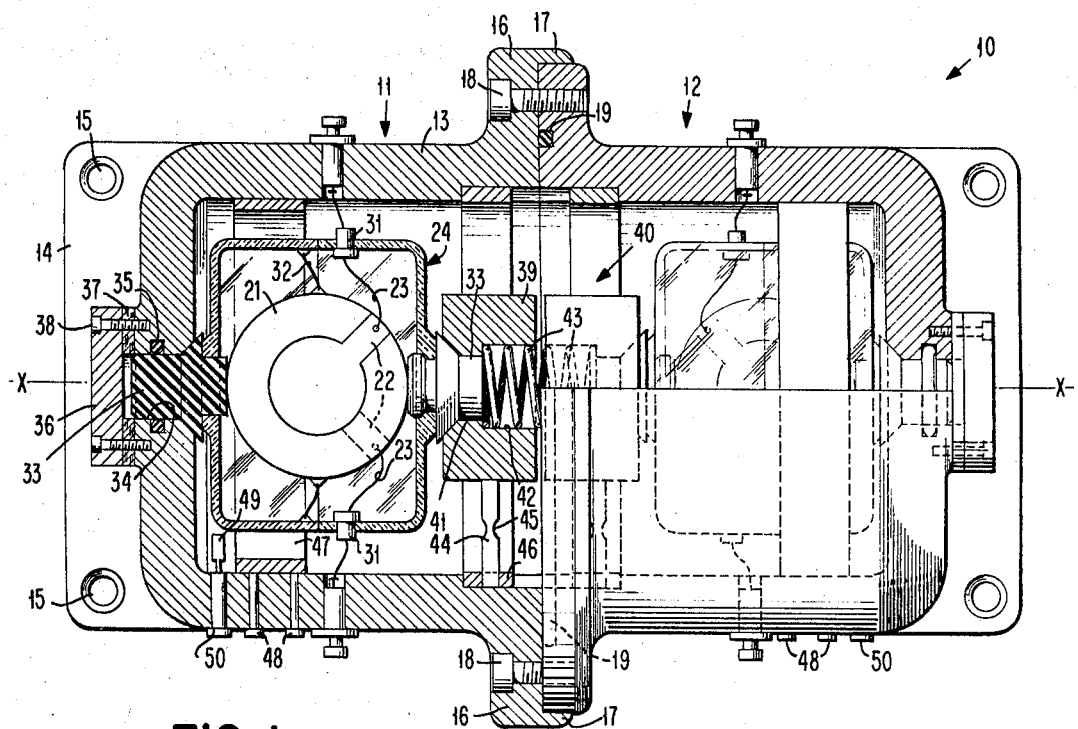
FIGURE 1 is an elevational view, partially in section, of the accelerometer arranged for measuring accelerations along a major axis X—X.

With reference now particularly to FIGURE 1, the accelerometer 10 of the invention is seen to be constructed generally in two substantially identical subassemblies 11 and 12 that cooperate to achieve the desired force measuring function. For this reason, the description of the structure will only be entered into in regard to the left subassembly 11, with it being understood that the mating subassembly 12 is identical, unless indicated otherwise.

Structurally the subassembly 11 includes a substantially cylindrical housing 13 having an open end and a closed end. The housing is secured to a flat mounting plate 14 (by means not shown) which, in turn, can be attached to any appropriate mounting surface by means of threaded members, for example, received through openings 15, or by any other suitable means.

The open end of the housing is flanged outwardly forming a continuous hub 16. The outwardly directed surface of the hub is faced off square to the cylindrical axis of the housing. In particular, the hub for subassembly 11 is of greater extent than that for 12, and is provided with a portion 17 for being received over the outermost part of the other hub when in assembled condition. That is, in final assemblage it is contemplated that the faced off surfaces of the two hubs be mated together, with threaded members 18 maintaining this condition. A sealing gasket 19 received within a similarly dimensioned circular groove in the face surface of the hub of subassembly 12 hermetically seals the casing to prevent contamination of the parts. The interior may be evacuated or filled with an inert gas such as helium, if desired.

Figure 2:
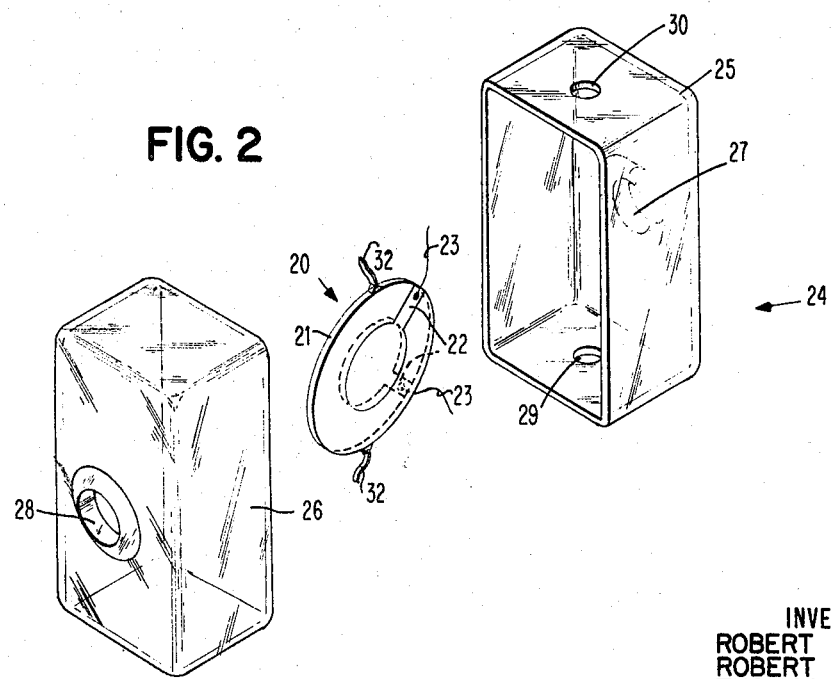
FIGURE 2 is an exploded view of a crystal sensor and enclosure mounting for use with the apparatus of FIGURE 1.

Turning attention now to both FIGURES 1 and 2, the crystal sensor 20 is seen to comprise a disc-like body 21 of a suitable crystalline material, such as quartz for example, that has been cut in the manner set forth in the above-noted co-pending patent application. As will be shown, accelerations to be measured are applied onto the edge of the disc-like body and generally in the plane thereof to operate the crystal in the required thickness shear mode. Piezoelectric voltage signals, the frequency variations of which are related to the accelerations to be measured as previously mentioned and as will be explained in greater detail hereinafter, are taken off the crystal body via relatively thin electrodes 22 deposited, for example, on each major surface with lead wires 23 providing external connection means.

Although not intended to be limited solely to the illustrated geometry, an enclosure 24 is provided for the crystal sensor consisting of a pair of identically shaped shell-like structures 25 and 26 constructed of a suitable gas impervious material, such as glass, for example. The two structures are fitted together to contain the sensor mounted within and an integral relationship achieved by either fusing of the glass parts to one another along their contacting edges, or by the use of a suitable cementitious material. Openings 27 and 28 are provided in the respective structures 25 and 26 in such manner that the disc-like body 21 can be presented edgewise and centrally with respect to each opening. As will be shown, it is through these openings 27 and 28 that forces are applied to the sensor 20. A further set of openings 29 and 30 is provided for accommodating terminals 31 connected to lead wires 23.

The crystal sensor 20 is resiliently mounted within the enclosure by a pair of formed leaf springs 32 constructed, for example, of beryllium copper. One extremity of the springs is secured to the periphery of the crystal disc and the other end is secured to the glass enclosure. The springs engage the crystal at substantially diametrically opposite points providing support along a line substantially 90 degrees to an axis drawn through the centers of the openings 27 and 28. When in supporting relation the springs have a curved appearance due to the exertion of a slight amount of preloading force onto the crystal sensor through compression of the springs.

Although as described above the lead wires 23 and leaf springs 32 are represented as separate structures, it is within the contemplation of the invention that the two functions of support and electrical connection can be accomplished by a single structure. For example, one way of accomplishing this would be to connect the inner end of the leaf springs to the electrodes 22, and anchor the springs in the glass of the structures 25, 26 with the outermost extremities of the springs being formed to serve as terminals.

Force applying members or force anvils 33 are received, respectively, within the openings 27 and 28 for directing forces applied to the apparatus onto the edges of the crystal body 21. These members are generally cylindrical and plug-like in construction with a hub for engaging the enclosure walls immediately adjacent the associated receiving openings to limit the inwardly extending portions to an amount sufficient to produce a good bearing contact with the crystal edges. The force anvils are constructed of such material as to permit being sealed to the glass walls of the openings. By this construction, the force anvils 33 are maintained in continuous contacting relation with the periphery of the crystal body 21. The force contacting surfaces of the anvils are shown as substantially flat areas, however, it is considered that for certain purposes these surfaces can have other forms, such as a knife-edge, or slotted to fit around the crystal edge, for example, Although the anvils and enclosure 24 are secured together, sufficient flexibility exists in the assemblage to prevent appreciable interference with the transmission of forces from the mass 40 to the crystal 20.

With the sensor 20 mounted within the enclosure 24 and the force anvils sealed in place, the interior of the enclosure is evacuated. This is important in that it prevents contamination of the crystal sensor which can affect its vibration characteristics. That is, stability of operation of such crystals has been found to be adversely affected by dirt, grease, fluxes, and the like.

When the sensor and its containing enclosure are mounted within, say, the left housing 13 the outwardly extending portion of one member 33 is tightly received within an opening 34 in the housing. This arrangement collimates the line through the centers of the members 33 with the cylindrical axis of the housing. An O-ring gasket 35 is received within a suitably shaped slot in the opening 34 to provide a sealing condition for the interior of the housing. A cap 36 and gasket 37 are secured over the opening 34 and contained force applying member 33 by threaded means 38 for taking up tolerance build up, for example.

The inwardly directed force applying member 33 carries one of the two members 39 comprising the seismic mass 40. More particularly, a member 39 is of generally cylindrical nature with an axially aligned opening 41 for fitting the force applying member into, and a second axially aligned opening 42 in the opposite end for receiving a coil spring 43 therein. As illustrated, in fully assembled condition the spring 43 exerts a force onto both members 39 along the cylindrical axis of the housing to apply a preloading force to both crystal sensors 20. The magnitude of this preload is just slightly in excess of the maximum acceleration force to which the accelerometer is expected to be subjected and perform a measurement. This initial amount of compressive force to which the sensors are subjected is important to permit the sensing of "negative" forces, that is, where the seismic mass moves in a direction away from the sensor.

In order to maintain axial stability of the mass 40 each of its component member masses 39 is supported by a pair of flexure elements 44. Each is a relatively rigid bar of material such as stainless steel, for example, with grooves cut therein as shown at 45 to produce a flexure point. The grooves are cut perpendicular to the axis X—X to provide for freedom of movement of the members 39 along this axis while restraining movement in other directions. One extremity of each support is secured to the periphery of an associated member 39 and the other extremity is similarly attached to a bandlike member 46 carried within the inner surface of the housing. As viewed along the housing axis, and for each of the flexure elements pairs, the flexure elements 44 in a pair that supports a member 39 are disposed at less than 180 degrees to one another, to reduce the possibility of movement of the members 39 along directions other than the X—X axis. In the illustrative embodiment the constituent members 44 of a pair are disposed at 90 degrees with respect to one another.

A strip heater 47, of a conventional electrical resistance type for example, is located on the inner wall of each housing 13 and extends in a substantially closed path about the associated crystal sensor and its enclosure 24. Electrical connection for the heater is provided to the exterior of the housing via terminals 48. In a way that will be brought out more fully in the discussion of the electrical circuit aspects below, the strip heaters are employed to maintain the sensors at uniform temperature to within a high degree of accuracy.

Of cooperative importance in this connection is the provision of a temperature measuring means 49 sensingly disposed within the housing and having an external connection terminal 50. As will be brought out more fully in the circuit description, the measuring means 49 serves a monitoring and controlling function with respect to the strip heaters. An excellent means for this purpose are those devices relying on the change in electrical resistance accompanying the change in temperature which certain materials, so-called thermistors, exhibit to a pronounced degree. Temperature control is especially important here since crystal sensors of this kind are highly sensitive to temperature variations requiring either temperature compensating means, or, as here, the maintaining of constant temperature.

The device described in the preceding paragraphs when subjected to accelerations along its force sensing axis X—X applies an increasing amount of force (positive force) to one crystal sensor while removing a similar amount of force (negative force) from the other sensor. The purpose of the preload force provided by the spring 43 is accordingly clarified, that is, tensile forces are not to be detected by the device, but rather different degrees of compressive stress of the crystal sensors. Moreover, with respect to a reference preload of compressive force the two crystal sensors provide complementary readings during a measuring operation (one greater than and one less than the preload force) that fully represent the causative acceleration.

Figure 3:
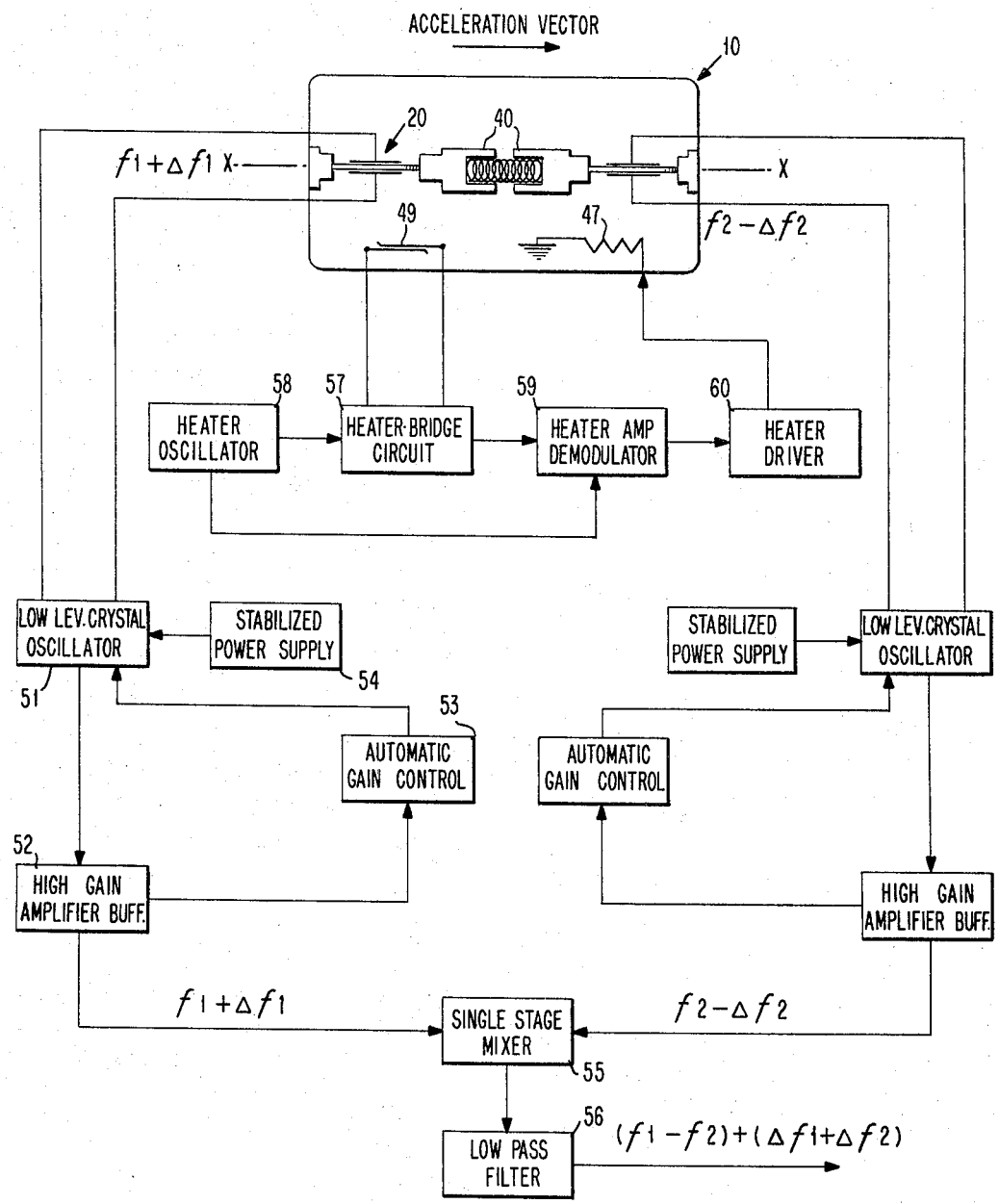
FIGURE 3 is a circuit diagram illustrating associated electrical apparatus aspects of the invention.

Turning now to FIGURE 3, the general approach is that of including the two crystal sensors 20 in separate oscillators as frequency control means to provide a pair of signals having frequencies of $(f1+\Delta f2)$ and $(f2-\Delta f2)$ where $f1$ and $f2$ represent fundamental oscillator frequencies and $\Delta f1$ and $\Delta f2$ represent the effect of the acceleration measured. In a manner well known to those skilled in the art, the applied voltage to the crystal from its associated oscillator causes the crystal to vibrate due to the crystal's piezoelectric properties and these vibrations in turn control or stabilize the fundamental frequency of the oscillator, the latter being designed to oscillate at a particular fundamental frequency at which mechanical resonance can exist in the crystal. Suitable mixing and filtering provides an output signal $(f1-f2)\pm(\Delta f1+\Delta f2)$ which is the desired equivalent of the acceleration to which the device is subjected. Peripheral apparatus for utilizing this signal is not shown since it can take any of a number of different forms.

Preferably, the frequencies $f1$ and $f2$ are made equal, so the term $(f1-f2)$ equals zero and the output becomes $\pm(\Delta f1+\Delta f2)$. If the fundamental frequencies are identical, the changes therein will also be substantially identical, due to symmetry of the system, and the last mentioned term becomes $\pm 2\Delta f$.

If desired, the oscillators may be arranged so that $f1$ and $f2$ are not equal, but are selected so that the term $(f1-f2)$ has a value slightly larger than the largest value the term $(\Delta f1+\Delta f2)$ may be expected to attain in measuring accelerations. The purpose of this would be to provide a positive output value which would increase or decrease in accordance with the sense of the acceleration measured. For example, where acceleration is in a direction to produce a positive $\Delta f1$ and a negative $\Delta f2$ (toward the right in FIGURE 3 as will be later described in more detail) the ultimate output is $(f1+\Delta f1)-(f2-\Delta f2)$ or $(f1-f2)+(\Delta f1+f2)$. Acceleration of opposite sense produces $(f1-\Delta f1)-(f2+\Delta f2)$ or $(f1-f2)-(\Delta f1+\Delta f2)$.

If $f$ and $f2$ are not equal, the changes in these frequencies, $\Delta f1$ and $\Delta f2$, will probably not be equal, although produced by the same acceleration. It has been found, however, that when $f1$ and $f2$ are maintained within reasonable limits, the terms $\Delta f1$ and $\Delta f2$ will vary only slightly, for example, in the third significant digit.

In either of the cases mentioned above, it has been found that with the apparatus provided in accordance with this invention, the frequency change $\Delta f1+\Delta f2$ or $2\Delta f$ is extremely linear over a broad dynamic range of accelerations, for example, of $10^6$ orders of magnitude. Direct digitization of the output is possible to provide an accurate digital readout.

Throughout the remainder of this description, the several frequencies will be referred by the general notation $f1$, $\Delta f1$, $f2$, $\Delta f2$, it being understood that this may refer to either of the two cases listed above.

Returning again to a description of FIGURE 3, it will be noted that that part of the circuitry associated with each force sensing crystal is the same. Accordingly, only one part will be described with it being assumed that the operation of the counterpart is identical. Assme as initial conditions that the left and right illustrated crystal sensors have natural frequencies of $f1$ and $f2$, respectively, and that the device is experiencing an acceleration along the axis X—X in the direction of the arrow marked ACCELERATION VECTOR. Accordingly, the left sensor is mechanically vibrating at a new higher frequency $(f1+f1)$ where $\Delta f1$ has a substantially linear relationship to the acceleration for the reasons set forth in the above noted co-pending patent application. This vibrating crystal is incorporated into the circuit of a low level crystal oscillator 51 in a well-known way for controlling the output frequency thereof to correspond to the frequency of vibration of the crystal. Exemplary of an oscillator circuit that is satisfactory for this purpose is that set forth on page 187 of the "Handbook of Electronic Control Circuits," by John Markus, published by McGraw-Hill 1959.

A high gain amplifier buffer 52 is fed by the oscillator output to provide an electric signal having a frequency of $(f1+\Delta f1)$ and of readily utilizable magnitude. A portion of the amplifier buffer signal is fed back via an automatic gain control means 53 to the oscillator for achieving stabilization in a known manner. Amplifiers suitable for use as the amplifier buffer 52 are well-known in the electronic art and for that reason no details are given. Automatic gain control is also a well-known concept, and the circuit described on page 303 of the text, "Transistor Circuit Analysis," by Maurice V. Joyce and Kenneth K. Clarke, published by Addison-Wesley Publishing Co., 1961, is fully satisfactory for this purpose.

A source 54 of stabilized D.C. power is required for operating the oscillator 51. However, since apparatus of this character is readily available commercially and well-known to those skilled in the electronics arts no details are provided.

As brought out earlier, the same acceleration produces a lessening of the stressed condition of the crystal sensor illustrated at the right in FIGURE 3, and its frequency of mechanical vibration is reduced from $f2$, the rate under preload stress, to a new value $(f2-\Delta f2)$. By a similar set of electrical circuits as described in the immediately preceding paragraphs an electric signal is obtained of a frequency $(f2-\Delta f2)$.

The two signals $(f1+\Delta f1)$ and $(f2-\Delta f2)$ are then mixed in a single stage mixer 55 to obtain a difference frequency signal, which is filtered by a low-pass filter 56 to obtain the component signal $(f1-f2)+(\Delta f1+\Delta f2)$. It is this signal which for present purposes can be considered the direct equivalent of the acceleration imposed upon the accelerometer and causative of the $(\Delta f1+\Delta f2)$ change in frequency. Illustrative of a suitable circuit for use as the mixer 55 is that shown on page 323 of the text, "Transistor Circuit Design," by the Engineering Staff of Texas Instruments, Incorporated, edited by Joseph A. Walston, and published by McGraw-Hill Publishing Co., 1963.

The temperature measuring means 49 which is of the temperature-varying-resistance type, such as a thermistor or platinum bulb, is electrically incorporated into a resistance bridge circuit 57 as a variable leg thereof. Excitation power for the bridge is provided by a heater oscillator 58 in the audio frequency range. Deviations of temperature within the housing of the accelerometer to a lower value from a predetermined one cause changes in resistance of the means 49 that unbalance the bridge circuit 57. During imbalance the bridge provides a signal to the heater oscillator for effecting transfer of electrical power to a heater amplifier and demodulator 59 that, in turn, produces a D.C. signal actuating a heater drive 60 for energizing the strip heater 47 and raising the temperature to the required value. In view of the well-known nature of the approach and the different units just described in connection with temperature control, no constructional features are given.

An accelerometer constructed in accordance with the description given here is a device that measures accelerations of a relative high $g$ value and with exceptional accuracy. Also, the read-out is in digital form making the device readily compatible with digital computing apparatus, with which resort is usually necessary particularly in navigational systems. Further, the type and arrangement of its different parts show it to be of relatively simplified construction and rugged, which is an enhancement from a reliability standpoint.

While the invention has been particularly shown and described with reference to a preferred embodiment thereof, it will be understood by those skilled in the art that various changes in form and details may be made therein without departing from the spirit and scope of the invention.

What is claimed is:

1. An accelerometer for detecting accelerations along a sensitive axis, comprising:
supporting frame means;
vibrating crystal means having first and second vibrating crystals carried by said frame means and disposed along said axis;
first and second seismic mass means movably mounted between said crystals for motion along said axis in response to said accelerations;
resilient means for disposing said first and second seismic mass means in force exerting relationship with respect to said crystals, said force exerting relationship placing said first and second crystals in a compressively prestressed condition under zero acceleration, said prestressed condition of said first and second crystals being increased and decreased, respectively, by said first and second seismic mass means in response to the magnitude of the accelerations applied along said axis in a given direction, and said prestressed condition of said first and second crystals being decreased and increased, respectively, by said first and second seismic mass means in response to the magnitude of the accelerations applied along said axis in an opposite direction; and
means for interpreting the changed stressed condition of the crystals to provide a signal indication representative of the corresponding applied acceleration.

2. An accelerometer according to claim 1, wherein said means for interpreting comprises oscillator means including said first and second crystals as control elements thereof, said signal indication comprising the output signal of said oscillator means, said output signal having a frequency to the applied acceleration.

3. An accelerometer for detecting accelerations along a sensitive axis, comprising:
supporting frame means;
vibrating crystal means having first and second vibrating crystals carried by said frame means and disposed along said axis;
first and second seismic mass means movably mounted between said crystals for motion along said axis in response to said accelerations, said first mass means being disposed adjacent to said first crystal and said second mass means being disposed adjacent to said second crystal;
resilient means disposed between said first and second mass means for resiliently mounting said first and second mass means with respect to each other and for disposing said first and second mass means in a force exerting relationship with respect to their adjacent crystals, said force exerting relationship placing said first and second crystals in a compressively prestressed condition under zero accelerations, said prestressed condition of said first and second crystals being increased and decreased, respectively, by said first and second mass means in response to the magnitude of the accelerations applied along said axis in a given direction, and said prestressed condition of said first and second crystals being decreased and increased, respectively, by said first and second mass means in response to the magnitude of accelerations applied along said axis in an opposite direction; and
means for interpreting the changed stressed condition of the crystals to provide a signal indication representative of the corresponding applied acceleration.

4. An accelerometer according to claim 3, wherein said means for interpreting comprises oscillator means including said first and second crystals as control elements thereof, said signal indication comprising the output signal of said oscillator means, said output signal having a frequency responsive to the applied acceleration.

5. In an accelerometer for detecting and measuring accelerations along an axis, comprising:
a pair of vibrating first and second crystal means each operating in shear mode;
a pair of first and second mass means mounted for movement along the axis and disposed in mutually exclusive bearing contact relationship with said first and second vibrating crystal means, respectively; and
resilient means for disposing said first and second mass means in a force exerting relationship with said first and second crystal means, respectively;
said force exerting relationship placing said pair of vibrating crystal means in a compressively prestressed condition under zero accelerations, whereby applied accelerations along the axis induce corresponding movements in said first and second mass means exerting an increased amount of force on one of the crystal means while simultaneously decreasing the amount of force exerted on the other of the crystal means to effect changes in the frequency of vibration of the crystal means representative of the applied accelerations.

6. A single degree of freedom accelerometer having a sensitive axis, comprising:
a pair of vibrating crystals operating in shear mode, each of said crystals having a frequency-of-vibration characteristic which is substantially linearly related to the mechanical stress condition thereof;
means for fixedly locating the crystals in a spaced generally opposed relationship;
a pair of spaced masses, each of said masses being in varying contact relationship with an exclusive one of the crystals, said masses being movably mounted between said crystals for motion along said axis in response to said accelerations; and
a coil spring contactingly arranged between said masses and in force exerting relationship for applying a compressively prestressed condition to each of said crystals via the masses under zero acceleration, said prestressed condition of one of said crystals being increased and said prestressed condition of the other crystal being decreased by their respective associated masses in response to the magnitude of accelerations applied along said axis in a given direction, and said prestressed condition of said one crystal being decreased and said prestressed condition of said other crystal being increased by their respective masses in response to the magnitude of the accelerations applied along said axis in an opposite direction, said changed stressed conditions of the crystals modifying the vibration characteristics of said crystals in response to the magnitude of the applied accelerations.

7. An accelerometer as in claim 6, in which there is further provided restraining means associated with the masses for preventing translation of the masses transversely of the sensing direction while permitting translation along the sensing direction.

8. An accelerometer for detecting acceleration along a predetermined axis comprising:
a supporting frame;
a pair of first and second crystals formed in the shape of discs, said crystals being cut in such a manner that forces applied radially at the periphery of the discs place the crystals in thickness shear mode, said crystals having the characteristic that the natural frequency of vibration thereof in said thickness shear mode varies linearly with the force applied;
a seismic mass resiliently mounted for motion along the predetermined axis;
resilient means for mounting one of said crystals at each end of said seismic mass between the mass and the supporting frame, said resilient means disposing said seismic mass in force exerting relationship with respect to said crystals, said force exerting relationship placing said first and second crystals in a compressively prestressed condition under zero acceleration, said prestressed condition of said first and second crystals being increased and decreased, respectively, by said seismic mass in response to the magnitude of the accelerations applied along said axis in a given direction, and said prestressed condition of said first and second crystals being decreased and increased, respectively, by said seismic mass in response to the magnitude of the accelerations applied along said axis in an opposite direction, the movement of said mass along said predetermined axis varying the force applied radially at the periphery of each said crystal disc;

an oscillator for each crystal electrically connected thereto so that the crystals provide frequency control for their respective said oscillators; and means for detecting variations in frequency of the output of said oscillators as a measurement of acceleration along said predetermined axis.

References Cited

UNITED STATES PATENTS

| | | | |
|---|---|---|---|
| 2,728,868 | 12/1955 | Peterson | 310—8.4 |
| 2,968,950 | 1/1961 | Dunbar et al. | 73—517 |
| 3,033,043 | 5/1962 | Runft | 73—517 |
| 3,045,491 | 7/1962 | Hart. | |
| 3,230,403 | 1/1966 | Lewis et al. | 310—8.7 |
| 3,201,984 | 8/1965 | Hinnah et al. | 73—517 X |
| 3,274,828 | 9/1966 | Pulvari | 73—517 X |
| 3,096,652 | 7/1963 | Cornelison. | |

FOREIGN PATENTS

| | | |
|---|---|---|
| 861,325 | 2/1961 | Great Britain. |

JAMES J. GILL, *Primary Examiner.*

RICHARD QUEISSER, *Examiner.*